Jan. 20, 1970  A. H. DESAUTELS  3,491,365
HELICAL DRUM RECORDER
Filed Nov. 12, 1968  3 Sheets-Sheet 2
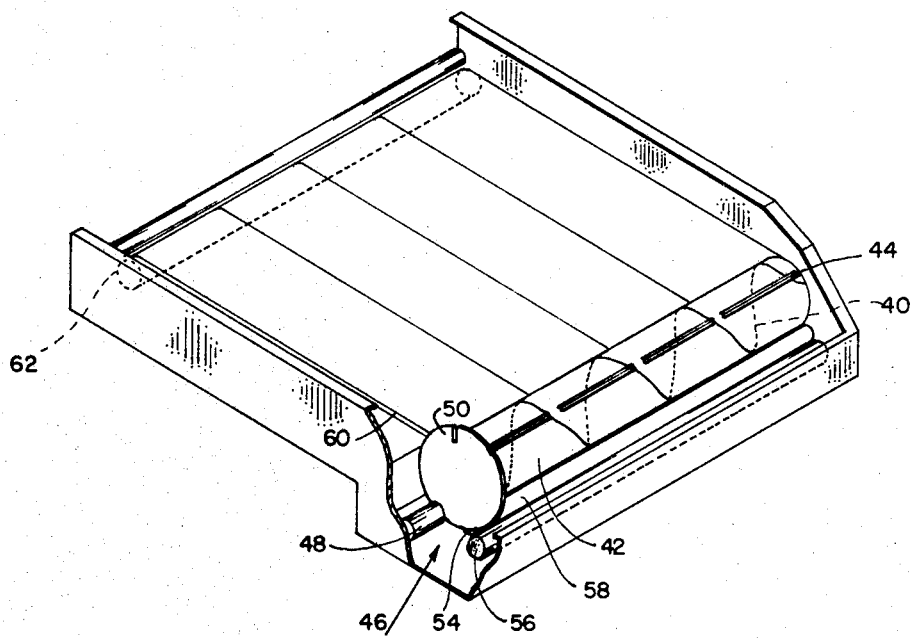
FIG. 3
INVENTOR.
ALFRED H. DESAUTELS
BY
ATTORNEY Jan. 20, 1970  A. H. DESAUTELS  3,491,365
HELICAL DRUM RECORDER
Filed Nov. 12, 1968  3 Sheets-Sheet 3
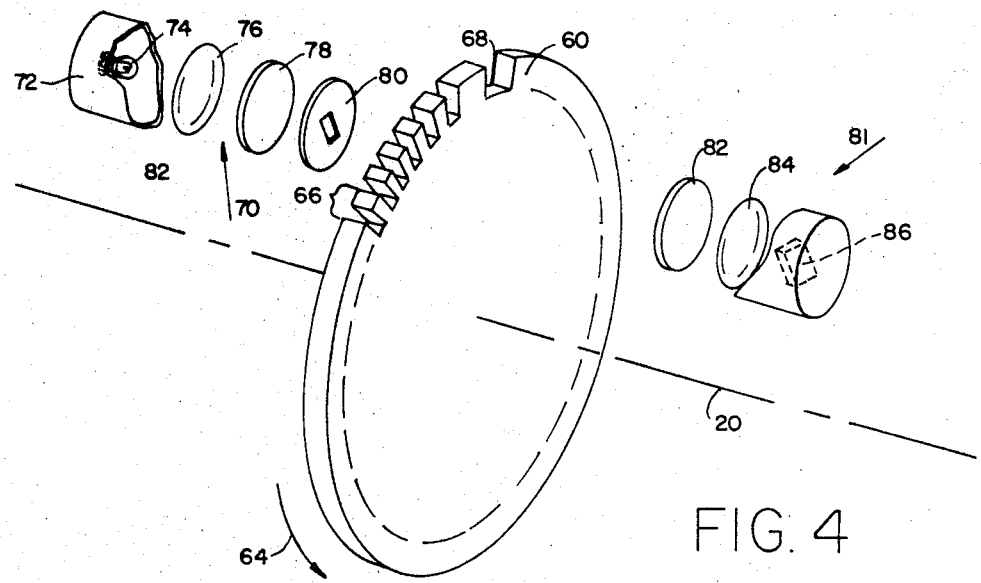
FIG. 4
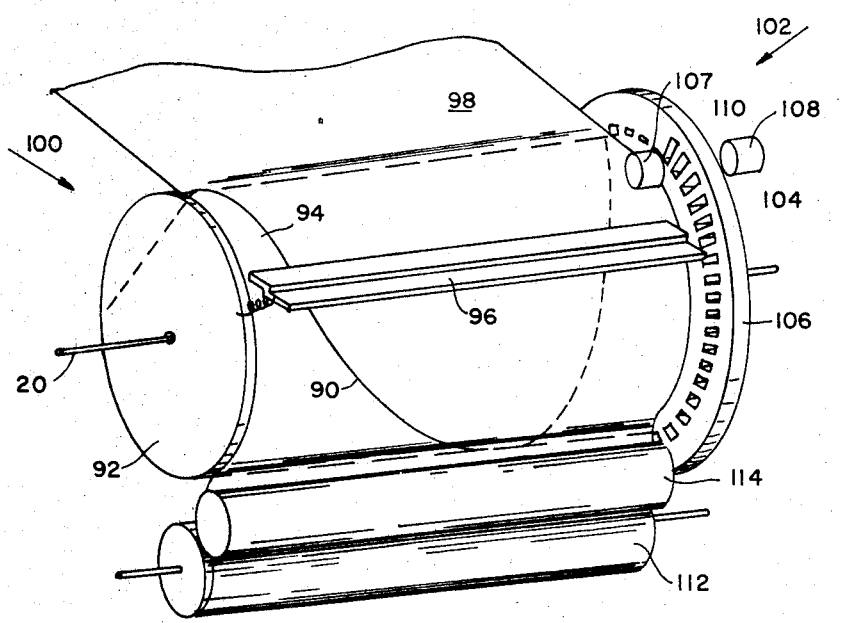
FIG. 5
INVENTOR.
ALFRED H. DESAUTELS
BY
ATTORNEY United States Patent Office 3,491,365
Patented Jan. 20, 1970

3,491,365
HELICAL DRUM RECORDER
Alfred H. Desautels, Nashua, N.H., assignor to Sanders Associates, Inc., Nashua, N.H., a corporation of Delaware
Filed Nov. 12, 1968, Ser. No. 774,693
Int. Cl. G01d 9/02, 15/06
U.S. Cl. 346—66                                   11 Claims

ABSTRACT OF THE DISCLOSURE

There is herein disclosed a helical drum recorder of improved resolution wherein a plurality of balanced metallic writing means are disposed parallel to a cylindrical drum upon which a helix wire having a plurality of turns is fixed in relief. Recording paper is passed between the writing means and helix wire such that for each revolution of the drum the point of contact between the writing means and the paper stretched over the helix wire will describe a straight line across the paper. The paper is transported past the writing bar at a preselected speed resulting in a repetitive scanning motion across the chart. Optical multiplexing means is provided to switch the signal to be recorded sequentially from one writing means to the next. In one embodiment of the invention a non-linear expanded scale recorder is provided.

BACKGROUND OF THE INVENTION

Field of the invention

The present invention relates generally to recording apparatus and more particularly to helical drum recorders such as may be used for facsimile recording.

Description of the prior art

Over the years there has been a continuing effort to improve the resolution of facsimile type recording apparatus. The closest known prior art in this regard is described in U.S. Patent No. 2,936,208 which issued to Walter Lupish on May 10, 1960. The Lupish apparatus employs a multi-turn helical electrode in association with a cam actuated linear electrode. The shortcomings of this apparatus are basically twofold. First, the helical electrode must of necessity be capable of being electrically coupled to a signal source while remaining free to move in rotation. Second, the reciprocating motion of the cam actuated linear electrode is a source of noise, vibration and wear.

OBJECTS AND SUMMARY OF THE INVENTION

It is thus a primary object of the present invention to provide a new and novel helical drum recorder which eliminates or circumvents the short-comings of the prior art.

It is another object of the present invention to provide apparatus of the above described character having improved resolution.

It is an additional object of the present invention to provide apparatus of the above described character having improved dynamic range.

It is further object of the present invention to provide apparatus of the above described character which is quiet in operation.

It is still an additional object of the present invention to provide apparatus of the above described character having an optical multiplexing means.

It is still a further object of the present invention to provide apparatus of the above described character using current writing techniques.

It is yet another object of the present invention to provide a self-cleaning helical drum recorder.

It is yet an additional object of the present invention to provide a helical drum recorder having a non-linear scale.

In carrying out the present invention a helical drum recorder comprises a cylindrical drum around which a wire is fixed in relief in the form of a helix having a plurality of sequential 360 degree turns. The edges of a plurality of writing means such as flat straight metallic bars are disposed parallel to the drum and held against the helix wire with light spring tension. Recording paper is transported between the helix wire and writing bars such that it is stretched over the helix wire and a portion of the paper is slightly raised by the helix wire into contact with the writing bars. As the drum is rotated, the point of contact between the paper and the writing bar will progressively describe a horizontal straight line across the paper. This point of contact is used as a path for current flow from the writing bar, which is at a potential above ground determined by the input signal, to electro-sensitive paper at ground potential.

The slope of the helix wire with respect to the longitudinal axis of the drum is preselected for a given resolution and may be non-linear such as to provide a logarithmic or otherwise expanded scale to the recorded information. The use of a plurality of bar-helix elements provides a high resolution recorder wherein the input signal to be recorded is switched sequentially from one writing bar to the next using electro-optical switching means. After the recording process the hard copy may be passed over a viewing platen for immediate analysis by an operator and then to a capstan driven storage roll.

The foregoing as well as other objects, features and advantages of the present invention will become more apparent from the detailed discussion taken in conjunction with the accompanying drawings. The scope of the invention will be indicated in the claims.

BRIEF DESCRIPTION OF THE DRAWINGS

FIGURE 3 is a perspective view with parts cut away of a recorder constructed in accordance with the principles of the present invention;

FIGURE 4 illustrates the electro-optical switching means of the apparatus of FIGURE 3;

FIGURE 5 is a perspective view with parts cut away of an expanded scale embodiment of the present invention.

DESCRIPTION OF THE PREFERRED EMBODIMENT

Figure 1:
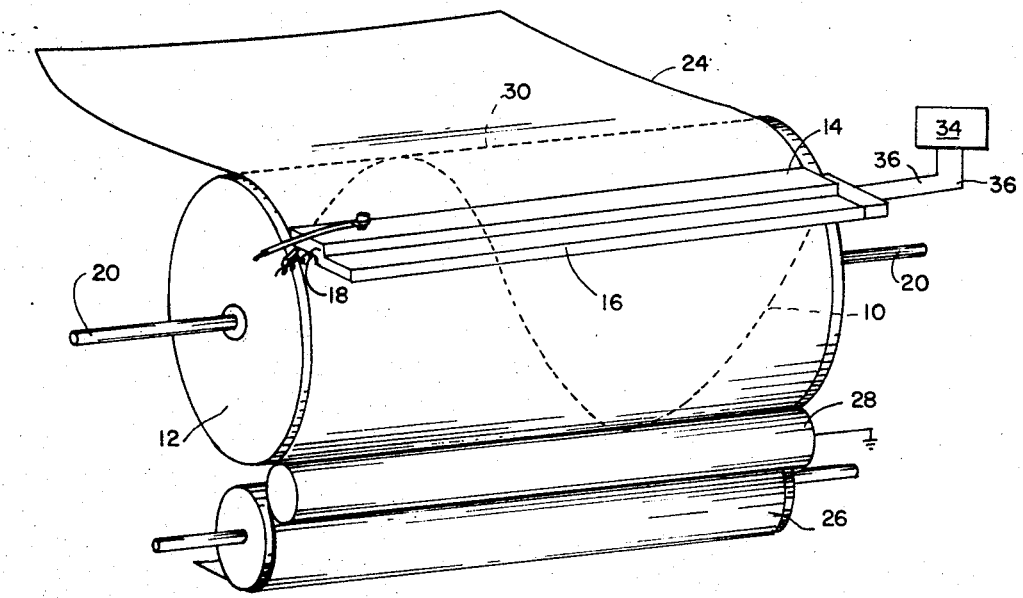
FIGURE 1 is a schematic perspective view of a helical drum recorder constructed in accordance with the principles of the present invention.

Referring now to the drawings and more particularly FIGURE 1 there is illustrated a helical drum recorder constructed in accordance with the present invention wherein a wire 10 is fixed in relief about a cylindrical drum 12 in the form of a 360 degree helix and the edge 14 of a balanced writing bar 16 is disposed parallel to the drum 12 and held against the helix wire 10 under light spring tension by a spring 18. As the drum 12 together with the helix wire 10 is rotated about its longitudinal axis 20, the point of contact 22 between the writing bar 16 and the helix wire 10 will progressively describe a horizontal straight line along the edge 14 of the writing bar 16. Recording paper 24 is fed from a supply roller 26, over a grounding rod 28 and passed between the drum 12 and the edge 14 of the writing bar 16 to a capstan driven take-up roll (not shown), such that the paper is slightly stretched over the helix wire 10. Thus the point 22 at which the writing bar 16 contacts the raised paper 24 describes a line across the paper in the aforesaid manner as the drum 12 is rotated. The paper 24 is transported past the writing bar 16 resulting in the repetitive scanning of lines such as line 30 across the paper 24. The width of the line 30 produced by rotation of the drum 12 is considered the line resolution of the recorder in the axis parallel to the drum 12. Line resolution in the axis perpendicular to the drum is determined by the parallel axis line width divided by the tangent of the helix angle. The tangent of the helix angle is equal to the circumference of the drum 12 divided by the length of the drum. Thus, the greater the helix angle the finer the line resolution of the recorder.

The recording paper 24 used with this embodiment of the present invention is of the front grounded type such as Film Base NDK as manufactured by the Fitchburg Coated Products Company of Scranton, Pa. This type of paper typically has a flexible insulative base such as Mylar and has voltage sensitive coating disposed on one surface thereof. The paper 24 is electrically grounded as it passes over the grounding rod 28. The input signal is applied to the apparatus as a voltage on the writing bar 16 and the contact point 22 thus provides a path for current flow from the writing bar 16 to the electrosensitive paper 24. It is to be understood that the helix wire 10 serves no electrical function in the operation of the present invention but does serve to mechanically produce the desired contact between the recording paper 24 and writing bar 16.

Since most electrosensitive recording paper is to a greater or lesser extent sensitive to impart and thus subject to recording of false, pressure modulated information, the writing bar 16 is both statically and dynamically balanced. Thus when the apparatus of the invention is used in an environment wherein extraneous external vibration is encountered the forces due to acceleration of the writing bar 16 are substantially zero. The writing bar is also spring loaded in torsion in order to track the helix wire 10 and is of low inertia.

It is further known that when so called current writing is used a residue from the electrosensitive paper 24 is deposited on the edge 14 of the writing bar 16. This residue, if permitted to accumulate, will have a degrading effect upon the line resolution of the recorder and may smear the recorded chart. To preclude residue build-up, a piezoelectric crystal 32 is affixed to one end of the writing bar 16 and energized by an A.C. electrical source 34 through leads 36. Alternatively an electromagnetically driven magnetostrictive crystal may be used. In operation, the crystal 32 vibrates the writing bar 16 along its longitudinal axis at a frequnecy preferably above 50 kilohertz which is well above the frequency of any signal to be recorded. In this manner the residue is continuously cleaned from the writing bar 16 without any degrading effect upon the line resolution of the apparatus.

Figure 2:
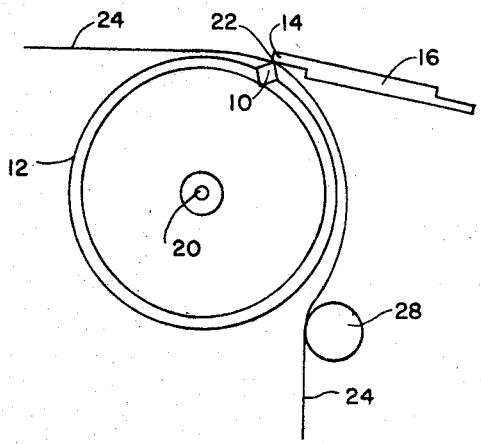
FIGURE 2 is a cross-section view of the apparatus of FIGURE 1.

For the purpose of clarity FIGURE 2 presents a cross-sectional schematic view of the apparatus of FIGURE 1 and better illustrates the manner in which the helix wire 10 is disposed about the drum 12 and the manner in which the electro sensitive paper 24 is passed over the ground rod 28 and between the helix wire 10 and the edge 14 of the writing bar 16. As stated hereinabove, the line resolution of the recorder is directly related to the angle at which the helix wire crosses the longitudinal axis of the drum. This angle may be maximized by either increasing the circumference of the drum or by decreasing the length of the drum. It will be obvious that the latter approach is preferred as it has no degrading effect upon the physical dimensions of the apparatus. Decreasing the length of the drum however operates to decrease the width of the recording which may be made and thus compresses the recorded information into an undesirably narrow space. FIGURE 3 illustrates in perspective a partially cut away view of a helical drum recording and display apparatus constructed in accordance with the principles of the present invention wherein line resolution is maximized without a degrading effect upon the width of the recording. In carrying out this embodiment of the invention a helix wire 40 having a plurality of turns is disposed along a single drum 42. For each complete turn of the helix wire 40 there is associated therewith a writing bar 44; each bar being electrically isolated from the succeeding bar. Each helix-bar combination thus operates in the above described manner to record a portion of the desired information. The input signal to the writing bars 44 is multiplexed by means of a time-phased optical clock shown generally at 46 and basically comprising an energy source 48, a chopper wheel 50 which is fixed to and rotates with the drum 42 and a receiver 52. This multiplexing means, which will be discussed in detail hereinbelow, operates to switch the input signal sequentially from one writing bar 44 to the next at the beginning of each revolution of the drum 42 about its longitudinal axis. Thus the helix angle and therefore the line resolution of the apparatus is maximized without compressing the information into an undesirably narrow recording. As described with reference to FIGURE 1 the recording paper 54 is supplied from a supply roll 56 and passes over a grounding rod 58 and drum 42 where it is stretched over the helix wire 40, assuming the contour thereof. After recording in the above described manner the recording may be passed over a viewing platen 60 for operator analysis and then taken up on a storage roller 62. A capstan drive take-up roll is preferred in the practice of the present invention since no perforations are required along the edges of the recording paper, however, other mechanisms may obviously be substituted.

The resolution of a recorder having a four turn helix wire and four writing bars fabricated by the applicants according to the principles of their invention has been found to be 270 lines per inch with a line width of .006 inch which is a significant improvement over the .016 to .020 inch resolution available with prior art apparatus.

Turning now to FIGURE 4 there is illustrated a more detailed view of the optical switch discussed hereinabove with reference to FIGURE 3. The switching of the input signal between the writing bars 44 of the embodiment of the present invention shown in FIGURE 3 is accomplished by electro-optical means. An optical chopper wheel 60 is disposed at one end of the cylindrical drum 62 such that it is coupled thereto and rotates about a common axis 20 therewith in the direction shown by the arrow 64. The chopper wheel 60 has a plurality of line pairs 66 of opaque and transparent segments about periphery thereof and a start aperture 68 disposed at a point on the wheel 60 which coincides with the beginning of the helix wire. The optical clock energy source generally designated as 70 comprises a housing 72 within which is disposed a suitable source 74 of optical energy such as a heated tungsten filament or the like, collimating lens 76, an infrared filter 78 and an aperture plate 80. Optical energy, shown as rays 82, produced by the source 74 and collimated by the lens 76 is filtered by the filter 78 such that only infrared energy exits the aperture plate 80 and is incident on the segmented portion of the chopper wheel 60. Energy passed by a transparent segment of the chopper wheel 60 is collected by the clock receiver shown generally as 81. The energy passes through an infrared filter 82 to remove any extraneous light which may have entered the systems and the filtered energy is focused by a lens 84 on a photodetector 86. The infrared filters 78 and 82 have the same bandpass and serve to define the optical bandwidth of the optical clock. This bandwidth is selected to eliminate any non-functional visible radiation and thereby enhance the signal-to-noise relationship of the detector 86. As the recording drum 62 rotates, the chopper wheel 60 rotates at the same rate and chops the radiation from the clock source 70 thus causing the output of the photodetector 86 to be a sinusoidally varying voltage having a frequency equal to the number of line pairs times the speed of rotation. As an illustrative example an optical clock may have 1200 pairs of opaque and transparent segments on the chopper. The photocell output may be applied to a buffer and provide 1200 information bins per revolution of the chopper. The input information over a 360 degree angle may be divided into 1200 directional information bins of 0.3 degree each. Alternatively, data over a 300 cycle bandwidth may be recorded and displayed in bins of 0.25 cycle.

In many applications of the present invention and in anti-submarine warfare in particular it is required that all information within some predetermined frequency spectrum be recorded and displayed, however, only some portion of this spectrum generally contains the vast bulk of the information of interest. For example, it may be required that information over the frequency range of 10 to 300 hertz be recorded but the bulk of the information lies between 150 and 250 hertz. It is thus highly desirable to have a recorder wherein the information in the frequency range of primary interest is recorded on an expanded scale. FIGURE 5 illustrates an embodiment of the present invention wherein the input information is recorded on a logarithmic scale. This feature is provided by arranging the helix wire 90 non-linearly about the drum 92 i.e. the slope of the helix wire is not of a constant value. Thus, as the drum 92 rotates, the point of contact 94 between the writing bar 96 and the recording paper 98 continues to describe a straight line across the paper, however, for a constant drum rotation speed the point of contact 94 moves more slowly across the paper 98 at the left end 100 of the drum 92 than at the right end 102. In this manner the information recorded on the left side of the paper 98 is on a compressed scale and the information on the right side is on an expanded scale. In order to maintain the dynamic range of this embodiment of the invention it is necessary to vary the input signal power as a function of linear writing speed, i.e. as the linear speed at which the point of contact 94 between the writing bar 96 and paper 98 increases the amplitude of the signal to be recorded must be proportionately increased to provide a constant writing intensity. This is accomplished by providing, in the case of logarithmic recording scale, a logarithmic aperture 104 in the chopper wheel 106. In this manner the amplitude of the radiant energy from the energy source 107 incident upon the receiver 108 is representative of the linear writing speed of the recorder. This energy is also amplitude modulated by the above-described alternating opaque and transparent segments disposed in the chopper wheel 106. The beginning 110 of the logarithmic aperture 104 is aligned such that it coincides with the beginning of the helix wire 90 at the left end 100 of the drum 92. Thus when the linear writing speed of the apparatus is relatively slow the output of the photocell 108 is low indicating that the amplitude of the input signal should be low. As the drum 92 rotates the logarithmic aperture 104 increases in width passing an increasing amount of radiant energy to the receiver 108. As the amplitude of the receiver output increases, the input signal amplification is correspondingly increased. The recording paper supply roll 112 and grounding rod 114 are the same in construction and operation as discussed hereinabove with reference to FIGURE 1. It will be apparent that any desired non-linear recording may be provided in this manner. It is only necessary that the helix wire be wrapped in the desired configurations and that the optical clock aperture be of a corresponding configuration to provide the proper input signal amplification. It is also to be understood that although for the purpose of clarity a single turn non-linear helix is described hereinabove the present invention also contemplates apparatus having a plural turn non-linear helix wire and a plurality of writing bars in the manner of the embodiment discussed with reference to FIGURE 3.

It will thus be seen that the objects set forth above, among those made apparent from the preceding description are efficiently attained and, since certain changes may be made in the above construction without departing from the scope of the invention, it is intended that all matter contained in the foregoing description or shown in the accompanying drawings shall be interpreted as illustrative and not in a limiting sense.

Having described what is new and novel and desired to secure by Letters Patent, what is claimed is:

1. Helical drum recording apparatus comprising
a cylindrical drum having a longitudinal axis of rotation,
a helical wire having a plurality of turns, and fixed in relief about the surface of said drum,
a plurality of linear writing means disposed in a plane parallel to the longitudinal axis of said drum, each associated with a single turn of said helical wire, and adapted to receive an input signal for recording on an electrosensitive recording blank passed under tension between said wire and said writing means such that said blank and said writing means are electrically continuous,
means for electrically grounding said recording blank, and
switching means coupled to said writing means whereby said input signal is sequentially directed to each of said writing means upon the completion of each revolution by said drum.

2. Apparatus as recited in claim 1 wherein
each of said writing means is statically and dynamically balanced.

3. Apparatus as recited in claim 1 further including
a piezoelectric crystal fixed to one end of each said writing means and activated by an alternating current source
whereby said writing means are vibrated along their longitudinal axes such that residue from said recording blank deposited thereon is continuously removed during the operation of the apparatus.

4. Apparatus as recited in claim 3 wherein
the frequency at which said piezoelectric crystal is activated is in excess of the highest frequency input signal to be recorded by said apparatus.

5. Apparatus as recited in claim 1 further including
a magnetostrictive crystal fixed to one end of each of said writing means and activated by an alternating magnetic field
whereby said writing means are vibrated along their longitudinal axes such that residue from said recording blank deposited thereon is continuously removed during the operation of the apparatus.

6. Apparatus as recited in claim 5 wherein
the frequency at which said magnetostrictive crystal is activated is in excess of the highest frequency input signal to be recorded by said apparatus.

7. Apparatus as recited in claim 1 wherein
said helical wire is disposed about said drum such that the helix slope is non-uniform
whereby input signals recorded on said recording blank are on a scale corresponding to the value of said slope.

8. Apparatus as recited in claim 7 wherein
said helix is a logarithmic function of the position of helical wire along the longitudinal axis of said drum.

9. Apparatus as recited in claim 8 wherein
the width of said slit in said disc increases logarithmically from substantially zero to a preselected maximum value as said disc is rotated through one full revolution.

10. Apparatus as recited in claim 7 including
means for varying the amplitude of said input signal in proportion to the linear writing speed of said apparatus.

11. Apparatus as recited in claim 7 wherein said amplitude varying means comprises
- a disc fixed to one end of said drum such that it revolves therewith about said axis and having a transparent slit disposed therein the width of which is inversely proportional to the slope of said helix wire,
- a source of collimated radiant energy disposed in a fixed position on one side of said disc, and
- a radiant energy detector means disposed on the side of said disc opposite said source in axial alignment therewith and having an electrical output indicative of the amount of energy being received whereby the amount of said radiant energy passed by said transparent slit and incident upon said detector means is proportional to the slope of said helix wire.

References Cited

UNITED STATES PATENTS

| | | | |
|---|---|---|---|
| 2,505,779 | 5/1950 | Long | 346—101 |
| 2,579,852 | 12/1951 | Olson | 346—39 |
| 2,911,881 | 11/1959 | Franklin | 250—233 X |
| 3,409,904 | 11/1968 | Maiershofer | 346—101 |

FOREIGN PATENTS 795,294  5/1958  Great Britain.

JOSEPH W. HARTARY, Primary Examiner

U.S. Cl. X.R.

346—74, 101